US006945693B2

(12) United States Patent
Kaiser et al.

(10) Patent No.: US 6,945,693 B2
(45) Date of Patent: Sep. 20, 2005

(54) COOKING THERMOMETER WITH AUDIBLE ALARM

(76) Inventors: Dolores C. Kaiser, 336 Golfview Rd., Apt. 1001, North Palm Beach, FL (US) 33408; Tommi L. Kuutti, 4970 Freedom Cir., Lake Worth, FL (US) 33461

( * ) Notice: Subject to any disclaimer, the term of this patent is extended or adjusted under 35 U.S.C. 154(b) by 13 days.

(21) Appl. No.: 10/722,286

(22) Filed: Nov. 25, 2003

(65) Prior Publication Data

US 2004/0074435 A1 Apr. 22, 2004

Related U.S. Application Data

(63) Continuation-in-part of application No. 10/218,980, filed on Aug. 13, 2002, now Pat. No. 6,736,086, which is a continuation-in-part of application No. 09/677,712, filed on Sep. 30, 2000, now Pat. No. 6,431,110.

(51) Int. Cl.[7] .............................. G01K 5/00; G01K 1/08
(52) U.S. Cl. ....................... 374/187; 374/160; 374/205; 374/208; 116/216; 116/221
(58) Field of Search ................................. 374/208, 100, 374/187, 160, 205; 116/216, 221; 99/342, 343

(56) References Cited

U.S. PATENT DOCUMENTS

| | | | |
|---|---|---|---|
| 1,918,258 A | 7/1933 | Fredericksen | |
| 2,898,845 A | * 8/1959 | Dight | .......................... 374/153 |
| 3,373,611 A | 3/1968 | Trott | |
| 3,778,798 A | 12/1973 | Heit | |
| 3,830,191 A | 8/1974 | Burke | |
| 3,967,502 A | 7/1976 | Moran | |
| 4,058,013 A | 11/1977 | Trott | |
| 4,059,997 A | 11/1977 | Trott | |
| 4,082,000 A | 4/1978 | Volk | |
| 4,083,250 A | 4/1978 | Goff et al. | |
| 4,088,863 A | 5/1978 | Jellies | |
| 4,089,222 A | 5/1978 | Perkins | |
| 4,154,105 A | 5/1979 | Mackley | |
| 4,354,448 A | 10/1982 | Lin | |
| 4,356,790 A | * 11/1982 | Gee | ............................ 374/160 |
| 4,503,800 A | 3/1985 | Schliep | |
| 4,748,931 A | 6/1988 | Volk | |
| 4,950,085 A | 8/1990 | Horvath | |
| 5,143,453 A | * 9/1992 | Weynant nee Girones | .. 374/205 |
| 5,312,188 A | 5/1994 | Ashe | |
| 5,487,352 A | 1/1996 | Williams et al. | |
| 5,537,950 A | * 7/1996 | Ou-Yang | ...................... 99/342 |
| 5,666,331 A | 9/1997 | Kollin | |
| 5,771,783 A | 6/1998 | Uss | |
| 5,988,102 A | 11/1999 | Volk et al. | |
| 6,065,391 A | 5/2000 | Archard et al. | |
| 6,230,649 B1 | 5/2001 | Yeung | |
| 6,431,110 B1 | * 8/2002 | Kaiser et al. | ................ 116/216 |
| RE37,988 E | 2/2003 | Uss | |
| 6,736,086 B2 | * 5/2004 | Kaiser et al. | ................ 116/216 |

FOREIGN PATENT DOCUMENTS

WO    WO 90/11497    10/1990

* cited by examiner

Primary Examiner—Diego Gutierrez
Assistant Examiner—Madeline Gonzalez
(74) Attorney, Agent, or Firm—McHale & Slavin

(57) ABSTRACT

A cooking thermometer having an audible alarm includes a skewer having a segment of a shape memory alloy wire disposed therein. The upper end of the shape memory allow wire is secured to a connecting rod which is operatively associated with a cam assembly. When the skewer and hence the shape memory alloy wire is heated, the shape memory alloy commences a phase transformation from martensite to austenite and contracts. The cam assembly serves to translate the up and down motion of the connecting rod into rotational motion which is transmitted through a spur gear assembly to a pivoting pointer positionable over a temperature indicia plate. A helical spring assembly is positioned on the top of the connecting rod which exerts stress on the connecting rod and shape memory alloy wire during the phase transformation to extend the temperature transformation range and improve and optimize the linearity of the transition.

19 Claims, 9 Drawing Sheets

COOKING THERMOMETER WITH AUDIBLE ALARM

CROSS REFERENCE TO RELATED APPLICATIONS

This application is a continuation-in-part of applicant's U.S. application Ser. No. 10/218,980, filed Aug. 13, 2002, now U.S. Pat. No. 6,736,086, which is a continuation-in-part of U.S. application Ser. No. 09/677,712, filed Sep. 30, 2000, now U.S. Pat. No. 6,431,110, the contents of which are hereby incorporated by reference.

FIELD OF THE INVENTION

This invention relates generally to a temperature measuring device for use in cooking food, and particularly to a cooking thermometer having an audible alarm to alert the user when the temperature of the food reaches a predetermined threshold level.

BACKGROUND OF THE INVENTION

Various food products must be cooked until the internal temperature of the food reaches a predetermined temperature. This is especially true with respect to meat due to health purposes and personal preference. By achieving a certain internal temperature, the preparer can be reasonably certain that the food contains no living organisms which are known to have an immediate effect in many consumers. Also, the preparer can serve a dish that conforms to the personal preference of the consumer, i.e. rare, medium, or well-done without the need of cutting open the food to check or attempt to rely solely on time cooked.

Conventional food thermometers incorporate a sensing probe for insertion into the food. Thus, if a thermometer only indicates temperature, the food preparer must diligently check the thermometer to determine when the food has reached the desired temperature.

There exist various cooking thermometer type devices that provide an indicator, such as a pop-up element or color change, which indicate when a threshold temperature has been reached in accordance with a predetermined measurement. However, these devices are generally not adjustable or precisely accurate. Thus, the preparer must diligently check the indicator to determine when the indicator is activated.

Conventional thermometer devices used for cooking require the preparer to carefully and diligently check the device to prevent the food from becoming overcooked. Should the food preparer become distracted with other dishes, a phone call, etc. and forget to check the thermometer, reliance on conventional cooking thermometer devices may result in the food becoming overcooked and possibly inedible.

Existing mechanical meat thermometers typically use a bi-metal helical spring in a skewer together with a spur gear assembly to turn a temperature indicating pointer. When heated, the bi-metal helical spring expands and the resulting rotational motion moves a pointer attached to the end of the spring. Bi-metal helical springs of suitable size to be used in a meat thermometer provide only a minuscule amount of force, typically only to turn the pointer, but not enough to trigger a ringing mechanism.

To provide an improvement over prior art meat thermometers, the present invention provides a cooking thermometer having an audible alarm and a probe which incorporates a shape memory alloy segment of wire, such as Nickel Titanium (NiTi, commonly known as nitinol), instead of the bi-metal spring used in existing thermometers. Shape memory alloys undergo a thermoelastic phase transformation in their crystal structure when cooled from the stronger, high temperature form (Austenite) to the weaker, low temperature form (Martensite). This inherent phase transformation is the basis for the unique properties of shape memory alloys, including the shape memory effect, superelasticity, and high damping capability.

When a shape memory alloy is in its martensitic form it is easily deformed to a new shape. However, when the alloy is heated through its transformation temperatures, it reverts to austenite and recovers its previous shape with great force. The temperature at which the alloy remembers its high temperature form when heated can be adjusted by slight changes in alloy composition, mechanical working, and heat treatment.

The shape memory alloys also show a superelastic behavior if deformed at a temperature which is slightly above their transformation temperatures. This effect is caused by the stress-induced formation of some martensite above its normal temperature. Because it has been formed above its normal temperature, the martensite reverts immediately to undeformed austenite as soon as the stress is removed. This process provides a very springy "rubberlike" elasticity.

One of the properties of nitinol alloys is that they do not undergo their phase transformation at one particular temperature. Instead, the transformation begins at one temperature (known as the start temperature, $M_S$,) and is completed at another temperature (known as the finish temperature, $A_F$). Thus, the heat deformation properties of shape memory alloys can be utilized to operate a temperature measurement device. For optimum economy of design, it would be highly desirable to provide a cooking thermometer with an audible alarm in which a shape memory alloy is simultaneously used for both an analog temperature reading and also to provide the mechanical force necessary to trigger an alarm bell.

DESCRIPTION OF THE PRIOR ART

Yeung, U.S. Pat. No. 6,230,649, discloses a meat thermometer with a mechanical alarm bell which includes a shape memory alloy probe in the form of a coiled spring. A latch is mechanically coupled to the shape memory alloy spring and releases a wind-up mechanism when the probe reaches a predetermined temperature. While the design of this device may perform the intended function, the use of a shape memory alloy in the form of a coiled spring is highly undesirable from a manufacturing standpoint. Shape memory alloys formed as coiled springs are extremely expensive to manufacture, and the production of a meat thermometer using such a spring would not be economically feasible. Also, this device has many practical drawbacks. While an alarm sounds when the end point is reached, the device does not provide a continuous indication of the actual temperature which would enable one to estimate the cooking time remaining. The Yeung device does not allow selective adjustment of the set point temperature, but rather each device is pre-set to an end temperature so that finer adjustments for individual preferences (i.e. more rare vs. well done) is not possible. If a different type of meat is to be cooked, the shaped metal alloy and associated components must be changed.

Other known prior art food visual thermometers include U.S. Pat. Nos. 4,059,997, 3,373,611, 5,312,188, and 1,918,258; and PCT Published Application No. WO 90/11497.

U.S. Pat. No. 6,065,391 discloses an electronic chef's fork which displays the degree of doneness of food. However, it is not adjustable and gives no audible signal.

U.S. Pat. No. 5,487,352 and U.S. Pat. No. 4,748,931 disclose a pop-up temperature indicator. The devices have a meltable seal that melts at a set point causing a portion of the device to pop-up thus alerting the user that the food is done. Again, there is no audible signal.

U.S. Pat. No. 4,083,250 discloses a food thermometer with an audible device. On reaching a set point cooking temperature, a valve opens enabling steam in a reservoir to activate a whistle alarm. This device does provide an audible alarm but requires filling and projects a hot steam upon activation.

U.S. Pat. No. 3,778,798 discloses a food thermometer for producing an audible alarm, but it is a complex unit generally only available as a permanent part of an oven.

U.S. Pat. No. 4,089,222 discloses a device for telemetry of the temperature of a mass undergoing temperature change, typically of a comestible being heated in an oven, and the like. The device includes a probe having a cavity which receives a thermally expansive material such as wax, a displacement member responsive to pressure developed by the temperature expansive material, a sonic or ultra-sonic signal generator, a latch mechanism inhibiting operation of the audio signal generator and a rod mechanically interconnecting the displacement member with the latch so that expansion of the material in the probe cavity trips the latch mechanism to permit generation of an output signal. The device also includes adjustment means for variation in the relative positions of the latch mechanism to the displaceable member whereby the triggering temperature for the latch mechanism can be fixedly U.S. Pat. No. 3,830,191 is directed towards a timer for various meats, including poultry, to audibly indicate when a meat has been cooked to a desired extent. The container is filled with a solution which creates steam, and upon escape of the steam an audible signal is produced which indicates completion of cooking.

Thus, what is needed is a means for audibly alerting the food preparer when the internal temperature of the food being cooked reaches a predetermined temperature which has an economy of design not demonstrated in the prior art.

SUMMARY OF THE INVENTION

Thus, it is an objective of the instant invention to provide a cooking thermometer having an audible alarm for alerting the user when the temperature of a substance reaches a predetermined threshold level.

It is another objective of the instant invention to provide a cooking thermometer probe which incorporates a linear segment of a shape memory alloy wire therein, whereby both an analog temperature indication as well as the mechanical force necessary to trigger an audible tension wound alarm assembly are provided.

It is a further objective of the instant invention to provide a cooking thermometer with an audible alarm that does not require filling with water or an electrical connection for operation.

It is still another objective of the instant invention to provide a cooking thermometer which does not require extraneous wires or cords so that the device can be used in meats on a rotating spit.

It is yet another objective of the instant invention to provide a cooking thermometer with an audible alarm that is adjustable and inexpensive.

It is a still further objective of the instant invention to provide a cooking thermometer whose threshold temperature setting can be adjusted without removal from the substance into which it is inserted.

It is yet an additional objective of the instant invention to provide a winding means for the audible alarm of a cooking thermometer which can be operated while the device remains inserted within the substance being monitored.

It is an additional objective of the instant invention to provide supplemental anchoring and anti-rotation means to aid in maintaining the cooking thermometer in its originally chosen position.

It is a further objective of the instant invention to provide a mesh curtain attached to the device which serves to shield the device from grease and other liquids during the cooking process.

It is a still further objective of the instant invention to provide a cooking thermometer which does not require the changing of internal components for varied cooking tasks.

In accordance with the above objectives, in a preferred embodiment of the invention, a cooking thermometer having an audible alarm is provided which is entirely mechanical in operation. The cooking thermometer has a generally cylindrical housing and a substantially hollow skewer extending coaxially from the lower surface of said housing. The housing assembly includes upper and lower portions which rotate with respect to one another to wind an alarm spring. A rotatable ring is circumferentially disposed between the upper and lower portions, and is linked to a set temperature needle so that the ring can be manually rotated to select the alarm point on the indicia plate.

A short linear segment of a shape memory alloy wire, preferably nickel titanium, is disposed inside the skewer and fastened to the distal end. The upper end of the shape memory alloy wire is secured to a connecting rod which extends upwardly into the housing and is vertically displaceable within the skewer. The upper end of the connecting rod is operatively associated with a cam assembly within the housing. When the skewer and hence the shape memory alloy wire is heated, the shape memory alloy commences a phase transformation from martensite to austenite and contracts, smoothly with significant force. The cam assembly serves to translate the up and down motion of the connecting rod into rotational motion. This rotational motion drives a spur gear assembly which is connected to a pivoting pointer positionable over a temperature indicia plate. The spur gear assembly provides the appropriate gear ratio to move the pointer through a predetermined arc for each degree change in temperature.

A spring biasing means, comprising a helical spring assembly including at least one helical spring, is positioned on the top of the connecting rod and exerts stress on the connecting rod and shape memory alloy wire during the phase transformation. This stress extends the temperature transformation range and improves and optimizes the linearity of the transition. The spring assembly, which in a most preferred embodiment includes both an inner and an outer spring, has parameters of length and spring constant which are configured to achieve the desired phase transformation characteristics.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Figure 1:
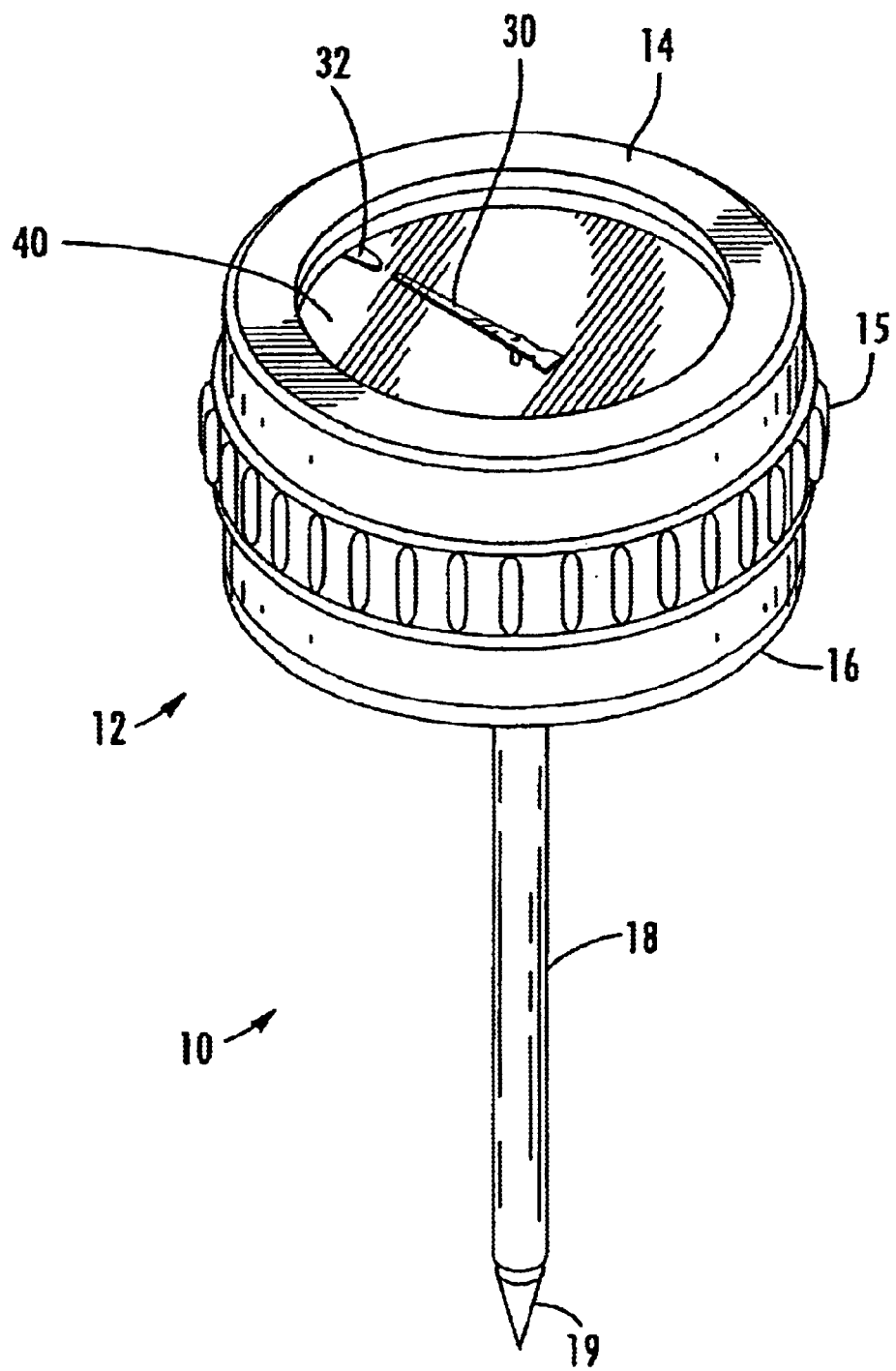
FIG. 1 is a pictorial view of the cooking thermometer according to a preferred embodiment of the invention.

A pictorial view of the cooking thermometer device 10 according to a preferred embodiment is shown in FIG. 1. The device 10 has a generally cylindrical housing assembly 12 and a skewer 18 extending coaxially from the lower surface. On the upper surface, a pivoting pointer 30 is positionable over a temperature indicia plate 40. The housing assembly 12 includes upper and lower portions rotatable with respect to one another, namely rotatable bezel 14 and lower housing 16. A rotatable ring 15 is circumferentially disposed between the rotatable bezel 14 and the lower housing 16 and is linked to the set temperature needle 32 so that the ring 15 can be manually rotated to select the alarm point on the indicia plate 40.

Figure 2:
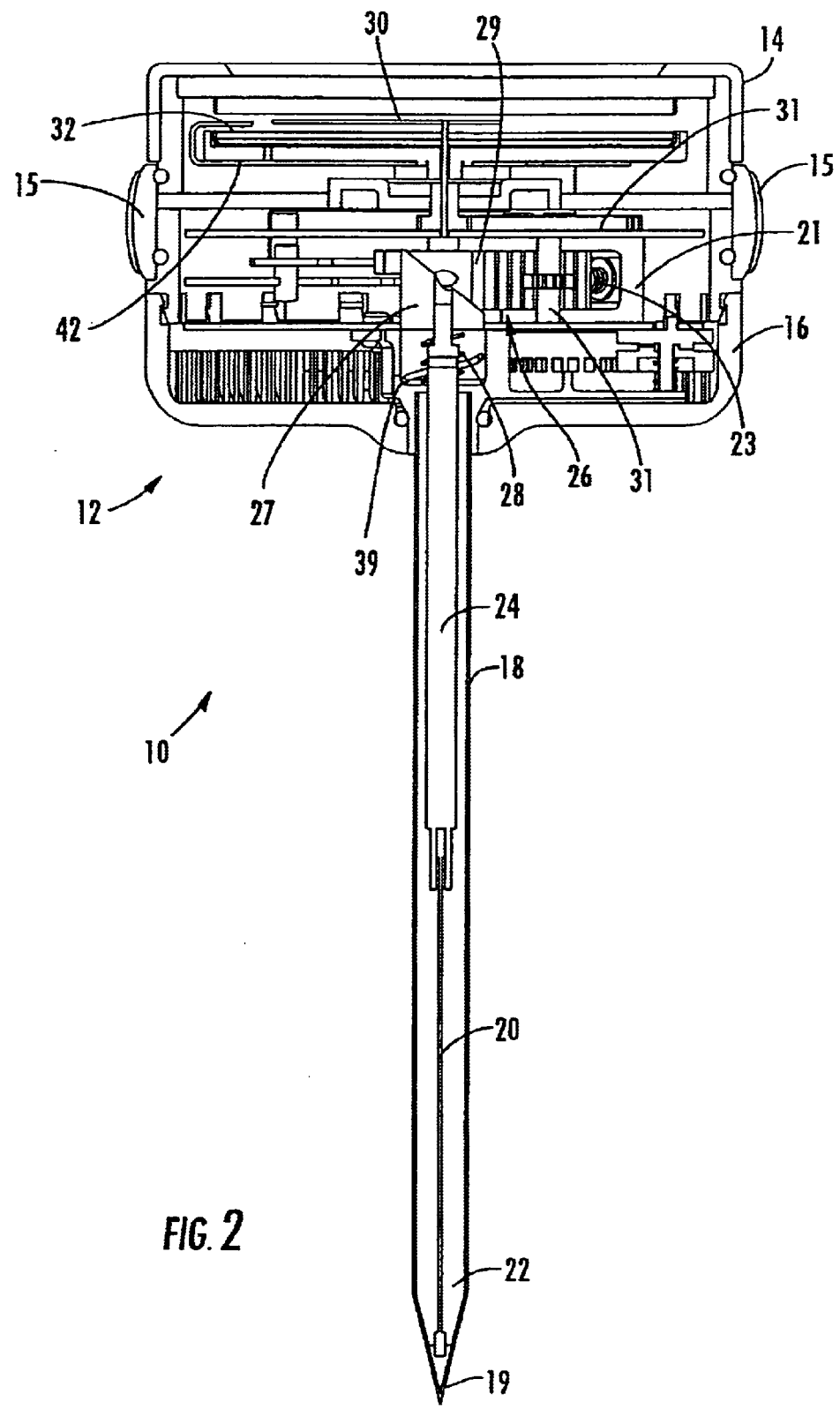
FIG. 2 is cross-sectional view of the cooking thermometer of the invention.

The construction of the housing 12 can best be seen in the cross-sectional view of the device 10 as shown in FIG. 2. Rotation of the rotatable bezel 14 with respect to the lower housing 16 winds an alarm spring 36 disposed in the lower housing (FIG. 2). The skewer 18 is substantially hollow, and has a sharpened distal end 19 adapted to penetrate meat to be cooked. A short linear segment of a shape memory alloy wire 20, preferably nickel titanium (nitinol) is disposed inside the skewer 18 and fastened to the distal end 19. The upper end of the nitinol wire 10 is secured to a connecting rod 24 which extends upwardly into the housing 12 and is vertically displaceable within the skewer 18. Barrel crimps, such as barrel crimp 22, can be used to secure the ends of the nitinol wire 20 to the skewer and the connecting rod respectively.

The upper end of the connecting rod 24 is linked to a cam assembly which is operable to translate the vertical displacement of the connecting rod 24 into rotational motion. In the preferred embodiment shown in FIG. 2, a rack gear assembly 26 is operativley associated with connecting rod 24. A rotating cam assmebly can also be used. As shown in detail in FIG. 3D, the rack gear assembly 26 includes a vertically displaceable cam 27 which is linked to connecting rod 24. The cam 27 has a linearly angled top surface which is adjacent to a rack gear 29. The rack gear 29 is movable normal to the cam 27 and has a angled end surface complementary to the top surface of cam 27. The rack gear 29 is slidably disposed in a rack gear housing 21, and a gear spring 23 in rack gear housing 21 biases rack gear 29 against cam 27. Thus, vertical motion of cam 27 results in horizontal translation of rack gear 29 within the rack gear housing 21, which in turn drives a spur gear assembly 31 which is connected to a pivoting pointer 30. The spur gear assembly 31 provides the appropriate gear ratio to move the pointer 30 through a predetermined arc for each degree change in temperature.

When the skewer 18 and hence the nitinol wire 20 is heated, the nitinol alloy commences a phase transformation from martensite to austenite. In the preferred embodiment, the composition of the nitinol alloy is selected so that the transformation begins at approximately 140° F. and is completed at approximately 185° F., representing the span of temperatures required for cooking meat. The nitinol wire in the preferred embodiment is "70C nitinol" alloy. The nitinol wire in the preferred embodiment should measure approximately 2 inches in length and have a diameter of approximately 0.008 inches. Though the device 10 as described herein utilizes nitinol wire, any suitable shape memory wire alloy having the requisite phase transformation characteristics can be used.

During heating, as the phase transformation progresses from martensite to austenite, the nitinol wire contracts, smoothly and with significant force. (The nitinol wire of the preferred embodiment would provide sufficient force during the phase transformation to lift the equivalent of a 2 lb. object.)

One of the properties of shape memory wire alloys, e.g. nitinol wire, is that the overall temperature span of the transformation and the linearity of the change in length versus temperature is a function of mechanical stress applied thereto. In the preferred embodiment, one of more springs of the appropriate length and spring constant are positioned to exert stress on the nitinol wire as it contracts, so that the stress exerted on the nitinol wire increases as the transformation progresses at a predetermined rate. As shown in FIG. 1, a helical spring 28 is coaxially positioned on the connecting rod 24. The upper end of connecting rod 24 includes a lip portion 25 which cooperates with the rotating cam 26 to retain the spring 28 in position while allowing vertical displacement of the connecting rod 24.

The increasing stress exerted by the spring assembly 28, which may be formed from stainless steel, on the nitinol wire 20 as it contracts provides additional separation of $A_F$ and $M_F$, the finish temperatures of the transformations to austenite and martensite respectively, thereby increasing the overall temperature span of the transformation so that the desired operating temperature can be achieved. Simultaneously, the increasing stress exerted by the spring on the nitinol wire during the phase transformation improves the linearity of the change in length versus temperature. In the preferred embodiment the spring 28 is selected to have a free length of about 0.38", a spring constant of about 7.0 lb/in, a solid length of about 0.096" and a load at solid length of about 1.7 lbs, which provides an operating temperature range of about 135° F. to 190° F. In the practice of the invention, the spring 28 and shaped memory alloy element can each be specified to encompass parameters which would permit operation in a plurality of desired temperature ranges, so the device can be used to measure the temperature for a variety of different substances.

The maximum recoverable strain limit for both superelastic and shape memory nitinol is approximately 6 to 8%. However, in the preferred embodiment, to increase repeatability, the strain is limited to 4%. In the preferred embodiment, using 2 inch length of wire, 4% strain represents a movement of the wire and the connecting rod of 0.080 inches, which is sufficient to accomplish the desired purpose. Limiting the strain to 4% enables the heating/cooling cycle to be accurately repeated up to 100,000 times.

In particulary preferred embodiment, the spring 28 is a spring assembly comprising two springs, an inner spring as described above, and an outer spring which has a free length of about 0.335 in., a spring constant of about 7.3 lbs./in, a solid length of about 0.104 in., and a load at solid length of about 2.3 lbs. This second or outer spring 39 is constructed and arranged to come under no load until the nitinol wire is shortened to approximatly half of its 0.080 in. travel length. Application of additional stress at the point of 50% travel distance of the nitinol expands the range of transition and improves linearity of the temperature response. By utilizing the second spring configuration, tuning of the device is more easily accomplished, since the second spring 39 mediates optimization of both the austenite/martensite transition region and linearity of the temperature response.

Figure 3A:
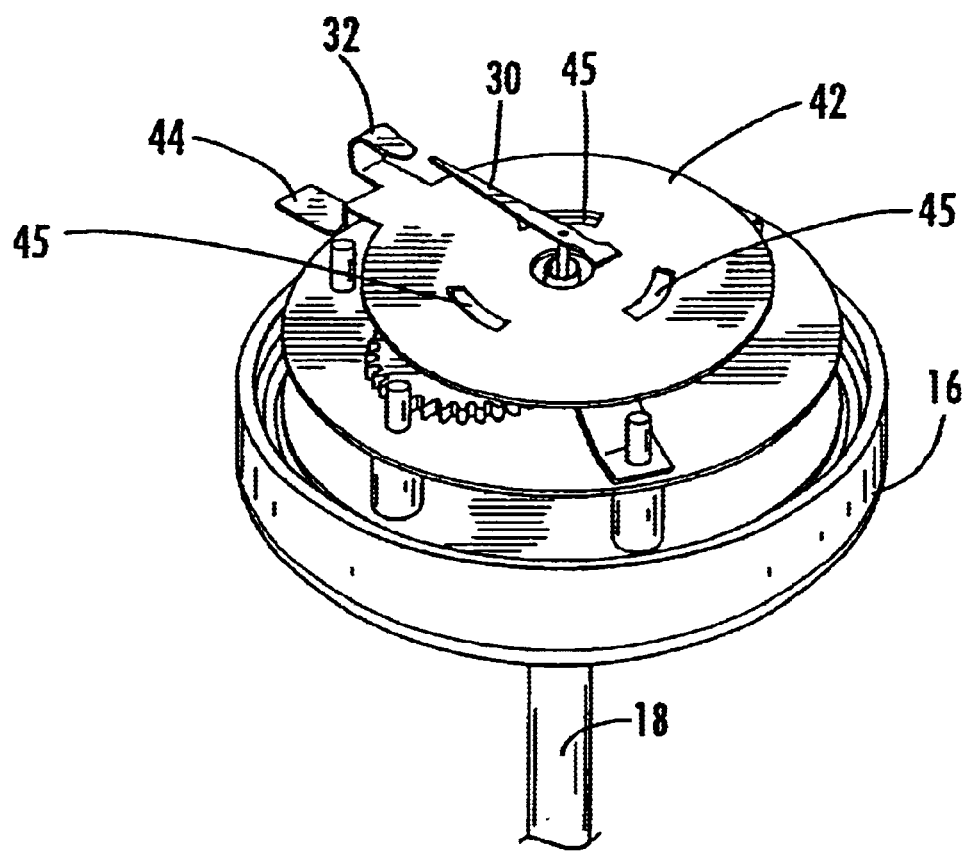
FIGS. 3A–E are successive exploded illustrations of the internal construction of the housing of the cooking thermometer of the invention.
Figure 3B:
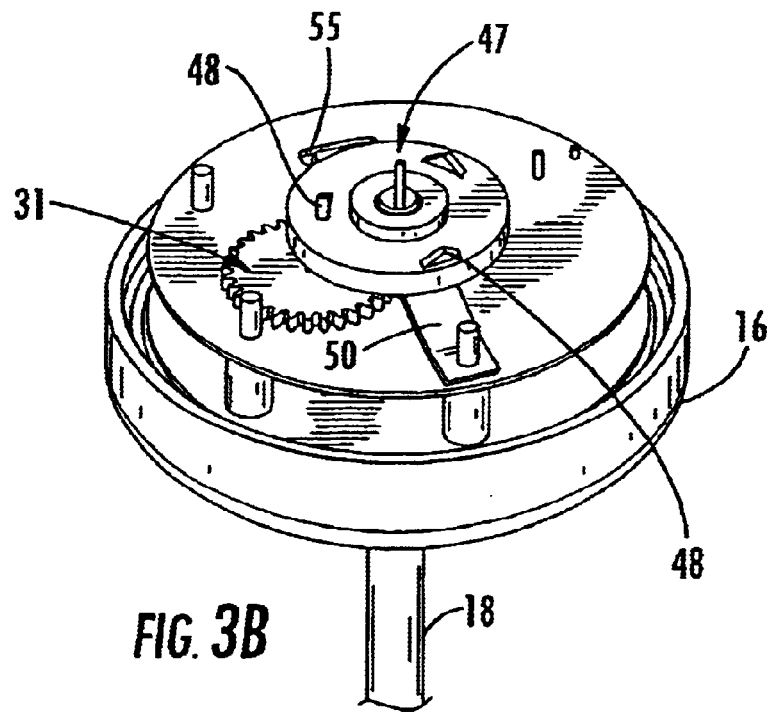
Figure 3C:
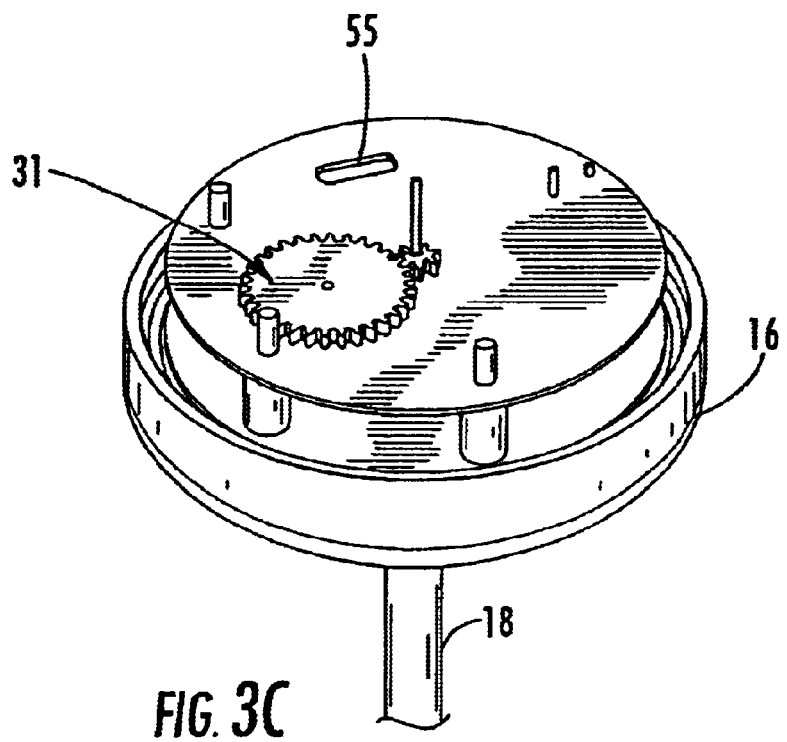
Figure 3D:
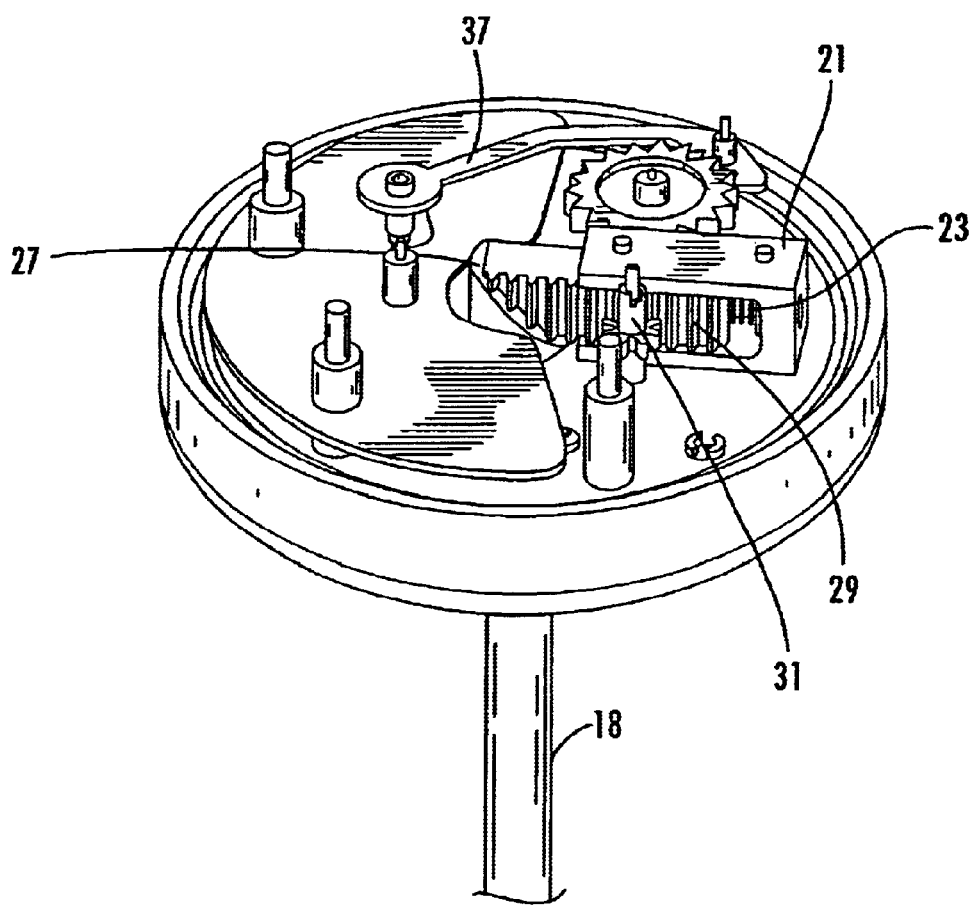
Figure 3E:
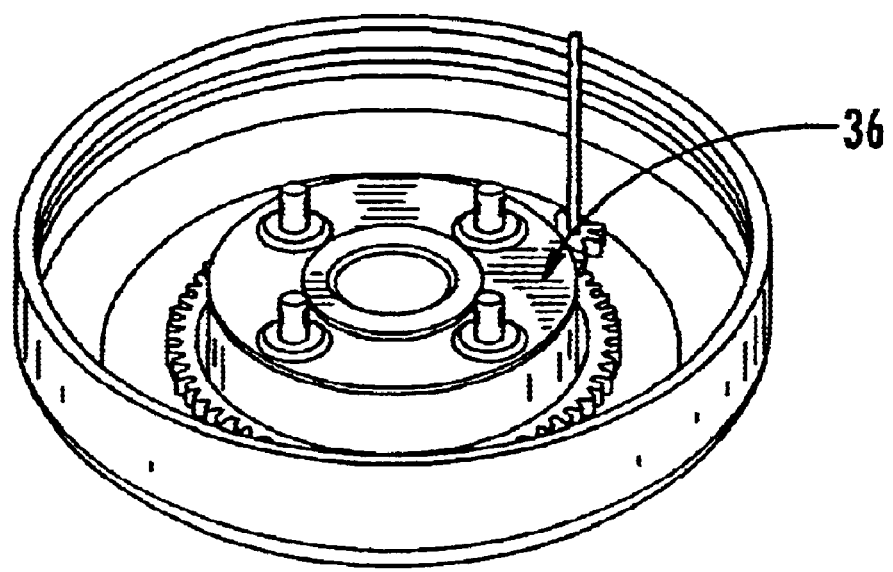

FIGS. 3A–F successively illustrate exploded views of the construction of the device 10. In FIG. 3A, rotatable bezel 14, rotating ring 15 and indicia plate 40 have been removed. It can be seen that the set point needle is integrally formed with a set point disk 42 which includes a tab 44 which is attached to rotating ring 15 (shown FIG. 1). The set point disk 42 includes a plurality of radially disposed apertures 45 which are configured to engage with cooperating protrusions 48 in the underlying trigger disk 47 (FIG. 3B) which is fixedly attached to the pointer 30 such that the trigger disk 47 rotates with pointer 30. As seen in FIG. 3B, the trigger disk is biased upward by a leaf spring 50. The leaf spring 50 includes a first fixed end 52 and a second free end 53. The free end 53 includes downwardly depending lip portion which extends into a slot 55 (FIG. 4B). The apertures 45 and the protrusions 48 are configured to be in engageable alignment when the pointer 30 and set point needle 32 coincide. When the pointer 30 reaches the set point needle 32, the protrusions are seated in the apertures, and the biasing force of the leaf spring urges the trigger disk upward, thus releasing the lip portion of the leaf spring from the slot 55. Referring to FIG. 3D, it is seen that this motion releases a hammer and bell assembly 56 which is driven by ringer spring 36 (FIG. 3E), and the alarm sounds. The phase transformation of the nitinol wire 20 (FIG. 2) provides the force to rotate the trigger disk 47 and pointer 30, and thus the force necessary to trigger the bell and hammer alarm assembly 37.

The above-described preferred embodiment is inclusive of an audible spring-wound alarm, however in an alternative embodiment of the invention, the alarm assembly is omitted from the device 10. For such an embodiment, the rotatable bezel 14 could be omitted, and the temperature set point selected by rotation of the rotatable ring 15 with respect to the housing assembly 12.

Figure 4:
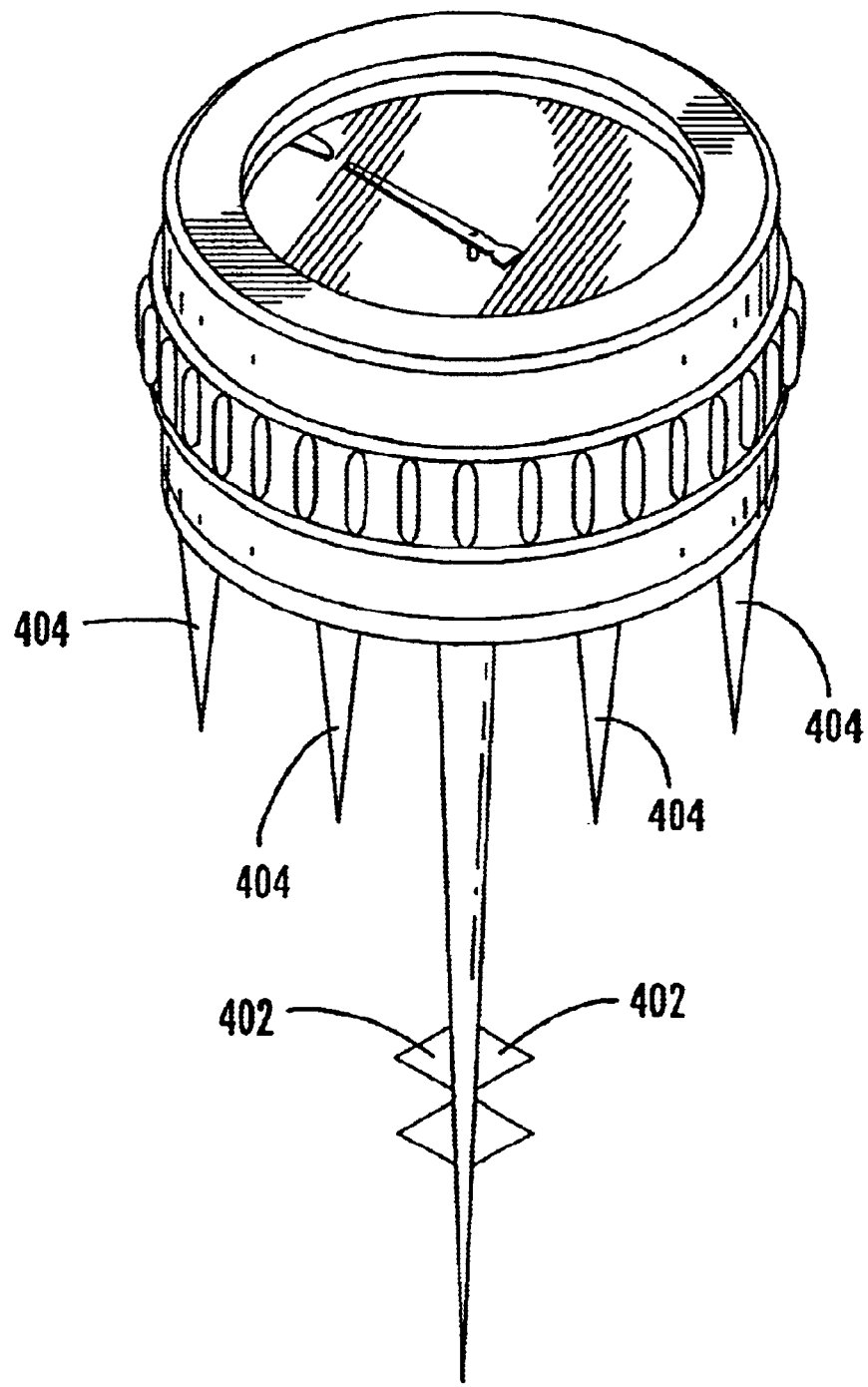
FIG. 4 is a side view of the device of FIG. 1 inclusive of supplemental anchoring and anti-rotation means.

With reference to FIG. 4, a pictorial view essentially as set forth in FIG. 1 is shown inclusive of one or more additional anchorage enhancement elements which can include anchoring protrusions 402, plural anchoring barbs 404 or combinations thereof. While these improvements are shown in the FIG. 1 embodiment, it is understood that they are not so limited, and may be included in any of the illustrated embodiments or equivalents thereof. The protrusions 402 and barbs 404 serve to enhance the ability of the instant thermometer device to remain in position given the dynamics encountered during cooking, for example in a rotisserie.

Figure 5:
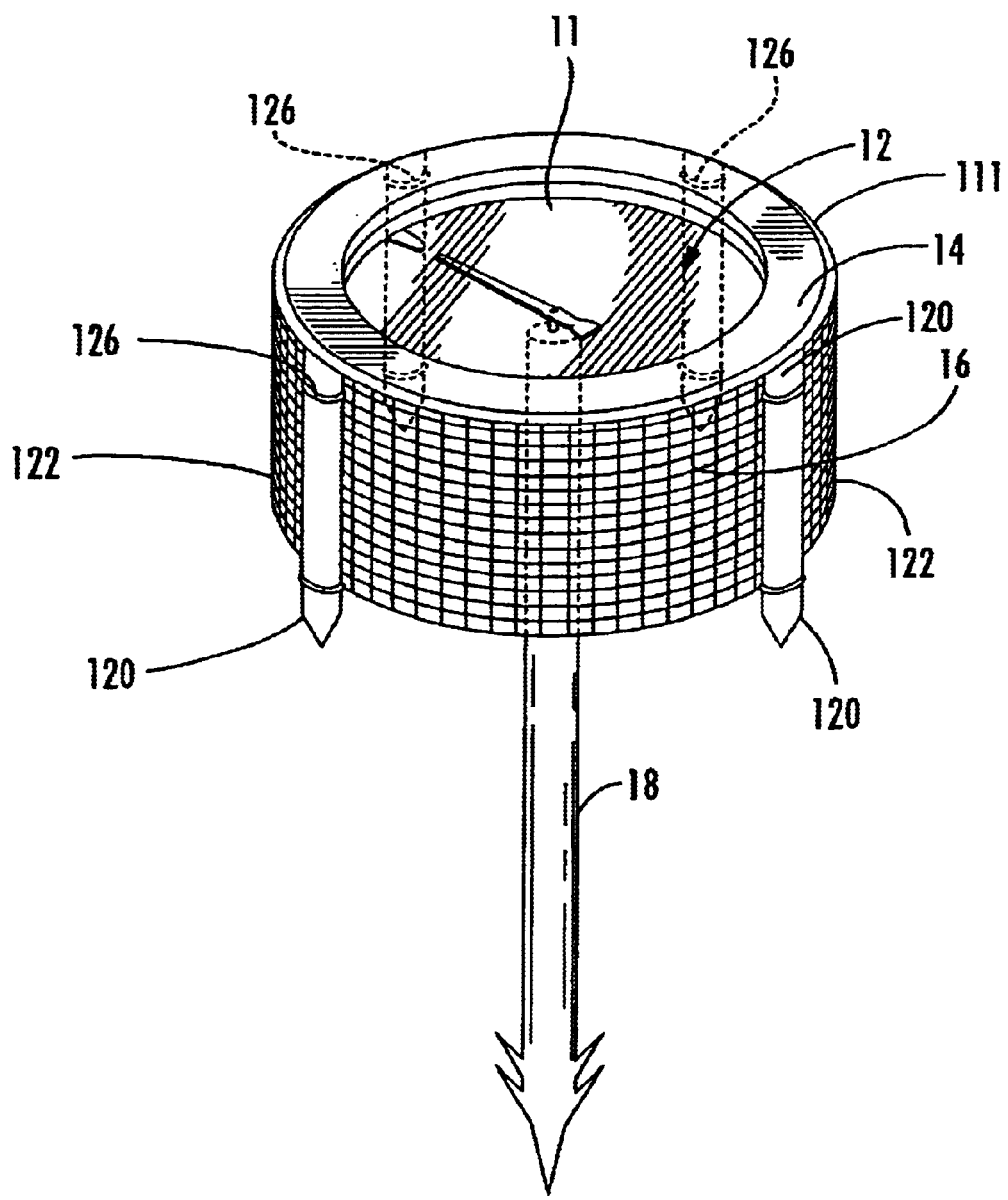
FIG. 5 illustrates an alternative arrangement of the device of FIG. 1 which includes a stainless steel mesh curtain to shield the device from grease.
Figure 6:
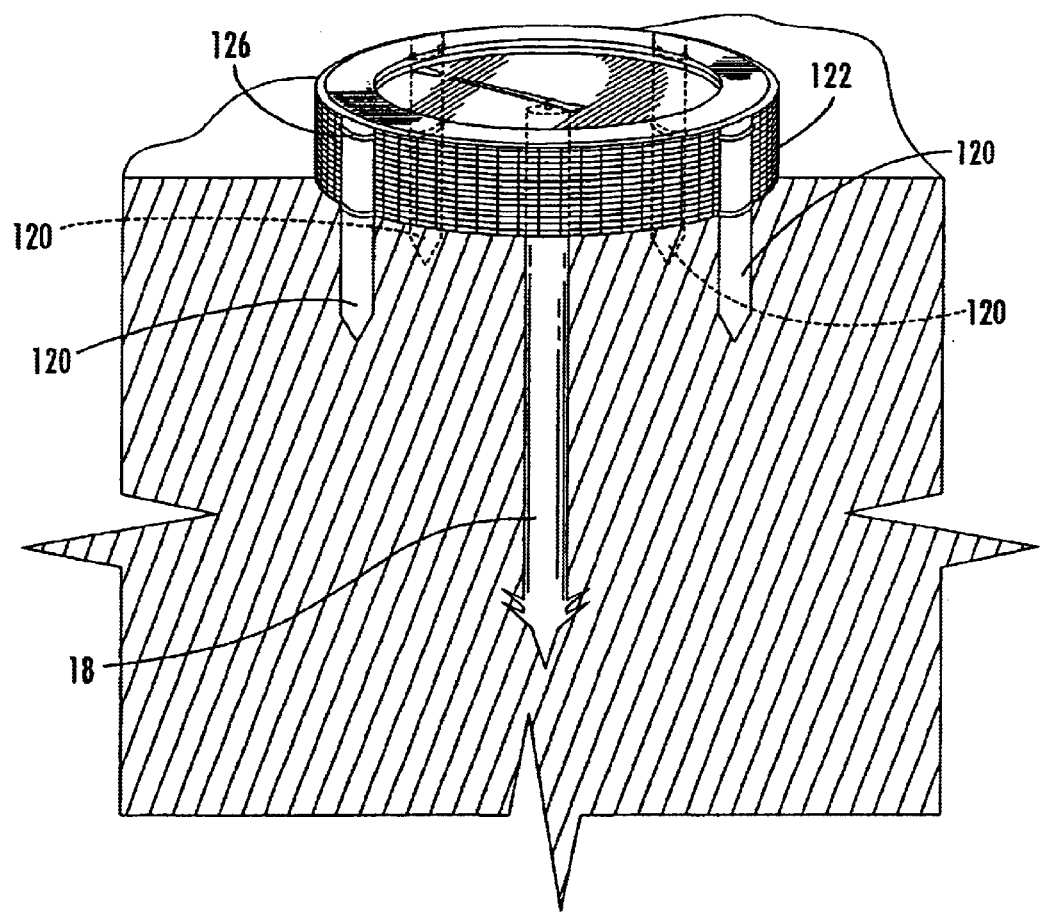
FIG. 6 illustrates the device of FIG. 6 inserted into a portion of meat to be cooked.

FIG. 5 illustrates an alternative embodiment of food temperature measuring device 10 which includes a mesh curtain 122 which serves to prevent grease from entering the housing through the openings between the rotatable bezel 14, the rotatable ring 15 and lower housing 16. In this embodiment, the rotatable bezel 14 includes an outwardly extending circumferential lip 111. A plurality of piercing implements 120 extend downwardly from the lip 111 so as to be substantially parallel to the skewer 42. In the preferred embodiment, the piercing implements 120 have a length less than the length of skewer 18, and anchor the device in place when the device is inserted into a food item. A mesh curtain 122 formed as a tube is circumferentially attached to the lip 111, and is preferably stainless steel mesh. A plurality of ring members 126 extend through said the mesh curtain 120 in alignment with the piercing implements 120. The ring members 126 are slidably positionable on the piercing elements 120 so that the mesh curtain 122 can be moved between raised and lowered positions relative to the piercing elements 120. In use, the device 10 is inserted into a portion of meat to be cooked until the piercing elements 120 are secured therein so that the somewhat compressed mesh curtain 120 rests on the surface of the meat, as shown in FIG. 6. The lower portion of the housing assembly 12 is thus contained within the mesh curtain 120, which advantageously prevents grease and other materials from reaching the sides and lower surface of the housing assembly 12.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

One skilled in the art will readily appreciate that the present invention is well adapted to carry out the objectives and obtain the ends and advantages mentioned, as well as those inherent therein. The embodiments, methods, drawings, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A cooking thermometer having an audible alarm, comprising:

a generally cylindrical housing assembly and a substantially hollow skewer extending coaxially therefrom, said skewer having a proximal end contiguous to said housing assembly and a sharpened distal end; said housing assembly further including a temperature indicia plate, a pivoting pointer movable over said indicia plate; a set temperature needle selectably manually positionable over said indicia plate, and a tension wound spring-type audible alarm mechanism activated by alignment of said set temperature needle and said pointer, a linear segment of heat contractible shape memory alloy wire disposed within said skewer and having a first end and a second end wherein said first end is fastened to said distal end of said skewer, said shape memory alloy wire being selected such that said wire begins phase transformation at a first lower temperature $M_S$ and completes phase transformation at a second higher temperature $A_F$;

a connecting rod disposed within said skewer and secured to said second end of said shape memory alloy wire; said connecting rod having an upper end extending into said cylindrical housing assembly;

a cam assembly operatively associated with said connecting rod wherein vertical movement of said connecting rod is translated into rotational motion and transmitted to said pointer through a gear assembly; and a spring biasing means constructed and arranged to exert stress on said shape memory alloy wire during phase transformation, said spring biasing means having parameters which are configured to impart desired phase transformation characteristics to said shape memory alloy;

whereby optimization of said phase transformation and linearity of temperature response are obtained.

2. The cooking thermometer of claim 1, wherein $M_S$ is approximately 140° F. and $A_F$ is approximately 185° F.

3. The cooking thermometer of claim 1, wherein said shape memory alloy is nickel titanium.

4. The cooking thermometer of claim 1, wherein said spring biasing means is at least one helical spring coaxially positioned on the upper end of said connecting rod, said at least one helical spring housed between upper and lower retaining members wherein said upper retaining member is contiguous to said connecting rod whereby contraction of said shape memory alloy compresses said spring.

5. The cooking thermometer of claim 4, wherein said at least one helical spring has a spring constant of about 7.0 lb/in., a free length of about 0.38 in., a solid length of about 0.096 in., and a load at solid length of about 1.7 lbs.

6. The cooking thermometer of claim 5, further including a second helical spring coaxially positioned on the upper end of said connecting rod adjacent said lower retaining member and concentrically arranged with said first helical spring, whereby said second helical spring does not come under load until said shape memory alloy has contracted about 50% of its travel distance, said second spring having a spring constant of about 7.3 lb./in., a free length of about 0.335 in., a solid length of about 0.104 in. and a load at solid length of about 2.3 lbs.

7. The cooking thermometer of claim 1, wherein said housing assembly includes upper and lower portions rotatable with respect to one another, wherein rotation of said upper portion with respect to said lower portion winds said alarm mechanism.

8. The cooking thermometer of claim 7, wherein said housing assembly further includes a rotatable central ring portion circumferentially disposed between said upper and lower portions, said central ring portion linked with said set needle to allow manual selection of a set temperature by rotation of the ring portion.

9. The device of claim 1, wherein said housing assembly further comprises a circumferential lip extending outwardly therefrom and a plurality of radially arranged piercing implements depending from said circumferential lip parallel to said skewer;

a mesh curtain formed as a tube circumferentially attached to said lip and extending downwardly therefrom; and a plurality of ring members extending through said mesh curtain proximate said piercing implements, said ring members slidably positionable on said piercing elements.

10. The device of claim 9, wherein said mesh curtain is comprised of stainless steel mesh.

11. The device of claim 1, wherein the distal end of said skewer includes a plurality of barbs extending therefrom adapted to retain said skewer within a food item.

12. A cooking thermometer, comprising:

a generally cylindrical housing assembly and a substantially hollow skewer extending coaxially therefrom, said skewer having a proximal end contiguous to said housing assembly and a sharpened distal end; said housing assembly further including a temperature indicia plate and a pivoting pointer movable over said indicia plate;

a linear segment of heat contractible shape memory alloy wire disposed within said skewer and having a first end and a second end wherein said first end is fastened to said distal end of said skewer, said shape memory alloy wire being selected such that said wire begins an austenite/martensite phase transformation at a first lower temperature $M_S$ and completes phase transformation at a second higher temperature $A_F$;

a connecting rod disposed in said skewer and secured to said second end of said shape memory alloy wire; said connecting rod having an upper end extending into said cylindrical housing assembly;

a cam assembly operatively associated with said connecting rod wherein vertical movement of said connecting rod is translated into rotational motion and transmitted to said pointer through a gear assembly; and a spring biasing means constructed and arranged to exert stress on said shape memory alloy wire during phase transformation, said spring biasing means having parameters which are configured to impart desired phase transformation characteristics to said shape memory alloy;

whereby optimization of said phase transformation and linearity of temperature response are obtained.

13. The cooking thermometer of claim 12, wherein MS is approximately 140° F. and AF is approximately 185° F.

14. The cooking thermometer of claim 12, wherein said shape memory alloy is nickel titanium.

15. The cooking thermometer of claim 12, wherein said spring biasing means is at least one helical spring coaxially positioned on the upper end of said connecting rod, said at least one helical spring housed between upper and lower retaining members wherein said upper retaining member is contiguous to said connecting rod whereby contraction of said shape memory alloy compresses said spring.

16. The cooking thermometer of claim 15, wherein said helical spring has a spring constant of about 7.0 lb/in., a free length of about 0.38 in., a solid length of about 0.096 in., and a load at solid length of about 1.7 lbs.

17. The cooking thermometer of claim 16, further including a second helical spring coaxially positioned on the upper end of said connecting rod adjacent said lower retaining member and concentrically arranged with said first helical spring, whereby said second helical spring does not come under load until said shape memory alloy has contracted about 50% of its travel distance, said second spring having a spring constant of about 7.3 lb./in., a free length of about 0.335 in., a solid length of about 0.104 in. and a load at solid length of about 2.3 lbs.

18. The cooking thermometer of claim 12, further comprising a set temperature needle selectably manually positionable over said indicia plate.

19. The cooking thermometer of claim 18, wherein said housing assembly further includes a rotatable central ring portion circumferentially disposed between said upper and lower portions, said central ring portion linked with said set needle to allow manual selection of a set temperature by rotation of the ring portion.

* * * * *